March 24, 1925.
G. W. PARKMAN
PAN
Filed March 7, 1924
1,531,127
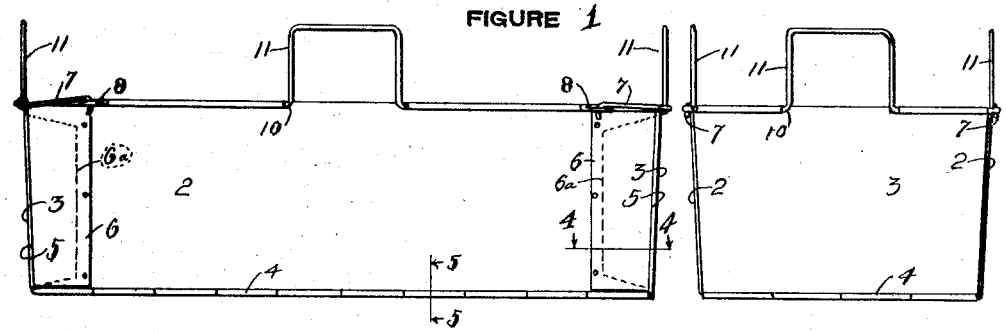
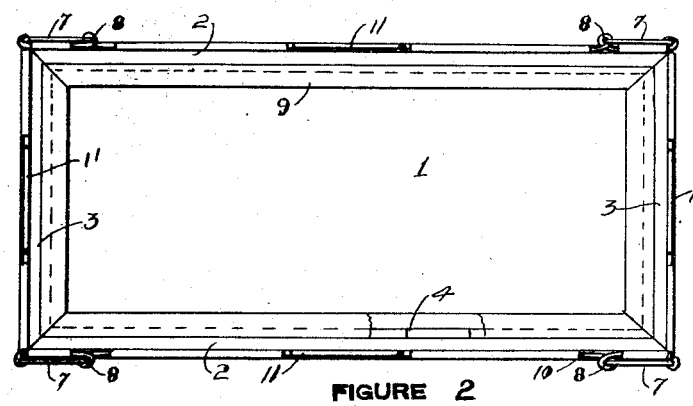
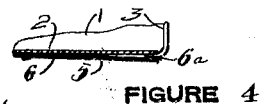
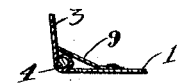
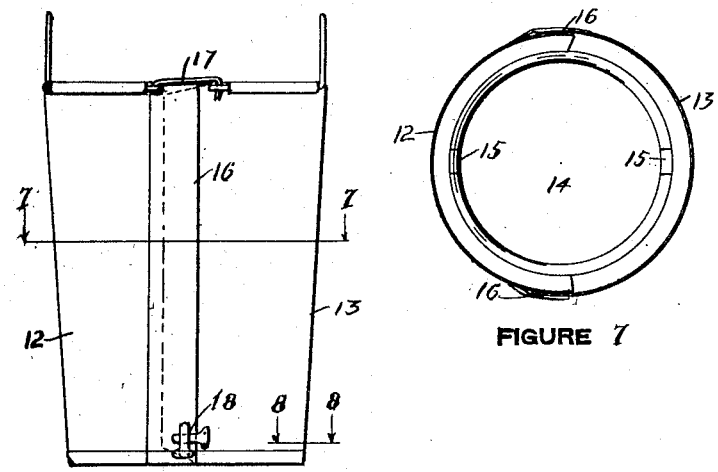
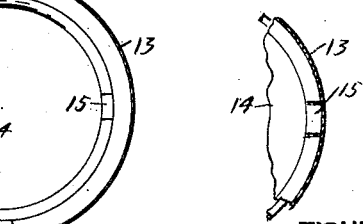
INVENTOR
George W. Parkman
BY John R. Naismith
ATTORNEY Patented Mar. 24, 1925.

1,531,127

UNITED STATES PATENT OFFICE.

GEORGE W. PARKMAN, OF SUNNYVALE, CALIFORNIA.

PAN.

Application filed March 7, 1924. Serial No. 697,523.

*To all whom it may concern:*

Be it known that I, GEORGE W. PARKMAN, a citizen of the United States, and a resident of Sunnyvale, in the county of Santa Clara and State of California, have invented certain new and useful Improvements in Pans, of which the following is a specification.

My invention relates particularly to that type of pans used in the baking of cakes and similar articles.

It is one object of my invention to provide a collapsible pan whereby a cake may be quickly and easily removed therefrom after baking without breaking the surface of the cake.

It is a further object of my invention to provide a pan of the character indicated provided with handles that may be used as supports if it is desired to maintain the cake in an inverted position while cooling as customary with a sponge cake.

It is a still further object of my invention to provide a pan of the character indicated that will contain a batter without leakage, and that will be simple in construction, easily assembled or collapsed, and that will be economical to manufacture and highly efficient in its practical application.

In the drawing:—

Figure 1 is a side elevation of my improved pan.

Figure 2 is a plan view of the same.

Figure 3 is an end view of the same.

Figure 4 is a section on line 4—4 of Figure 1.

Figure 5 is a section on line 5—5 of Figure 1.

Figure 6 is a side elevation of another embodiment of the invention.

Figure 7 is a section on line 7—7 of Figure 6.

Figure 8 is a section on line 8—8 of Figure 6.

Referring more particularly to the drawing, I show at 1 the bottom plate of a cake pan to which are hinged the two side elements 2—2 and the two end elements 3—3 by means of hinges 4.

At each end of each side element is formed a slot 5 by mounting thereon a side piece 6, and on each end of each end element 3 is formed an inwardly directed flange 6$^a$ arranged to engage the adjacent slot 5 whereby to form tight corners when the sides and ends are brought into engagement in preparing the pan for use.

When the sides and ends are in position for use the parts are securely held in position by means of hooks 7 mounted on the ends of end elements 3 and engaging eyes 8 arranged adjacent to the ends of side elements 2.

To cover the hinges 4 and prevent the escape of batter therefrom I secure a flange 9 to the bottom 1 of the pan in such a manner as to extend over the hinges 4 and engage the side and end elements 2 and 3 when raised into position as described.

The top of each side and end element is rolled over a wire 10 and this wire is formed into a loop 11 at the center of each of said side and end elements whereby to form handles as shown, or to support the pan in an inverted position if so desired.

In removing the baked cake from the pan it is only necessary to unfasten hooks 7 and drop the side and end elements. If the cake should stick a little to said side or end elements it is easily loosened by running the blade of a knife along that surface, the loosening and dropping of one side or end rendering it easy to separate and drop the remaining parts.

In Figures 6, 7 and 8 I show a form in which the pan is circular in plan, the top being divided into two halves 12 and 13, hinged to a bottom 14 as at 15 and having engaging edges 16 as described with reference to the embodiment hereinbefore disclosed. These halves are secured by hooks 17 at the top and by engaging fingers 18 at the bottom.

In using a pan constructed as described it is assembled as shown in Figure 1 and the batter placed therein. The construction of the corners and the protection afforded the hinges prevents any leakage of the batter from the pan.

After baking the sides and ends of the pan are disconnected and allowed to fall away from the cake, leaving it free and clear for removal thereby preventing the breaking of the cake such as so frequently occurs in the old style of pan.

While the handles 11 are useful in handling the pan they are of still further use if the pan has been used in baking a sponge cake. In this case the entire pan and the cake therein are inverted during the cooling of the cake, the handles functioning as legs to support the cake a distance from the table while the cooling and further expansion of the same takes place. After cooling the sponge cake is removed as hereinbefore described.

It is to be understood, of course, that while I have herein shown and described the preferred embodiment of my invention, changes in form, construction, and method of operation may be made within the scope of the appended claim.

I claim:—

A pan comprising a flat bottom member, interlocking enclosing members hingedly mounted to the edge thereof, means for securing said members in erect interlocking position with relation to each other, and flanges mounted upon said bottom member and extending over the hinged mountings and engaging said side members when in erect interlocking position and closely overlying the hinges.

GEORGE W. PARKMAN.